(No Model.)
J. J. LA FLEUR.
TAG FOR BARBED WIRE FENCES.
No. 249,777. Patented Nov. 22, 1881.
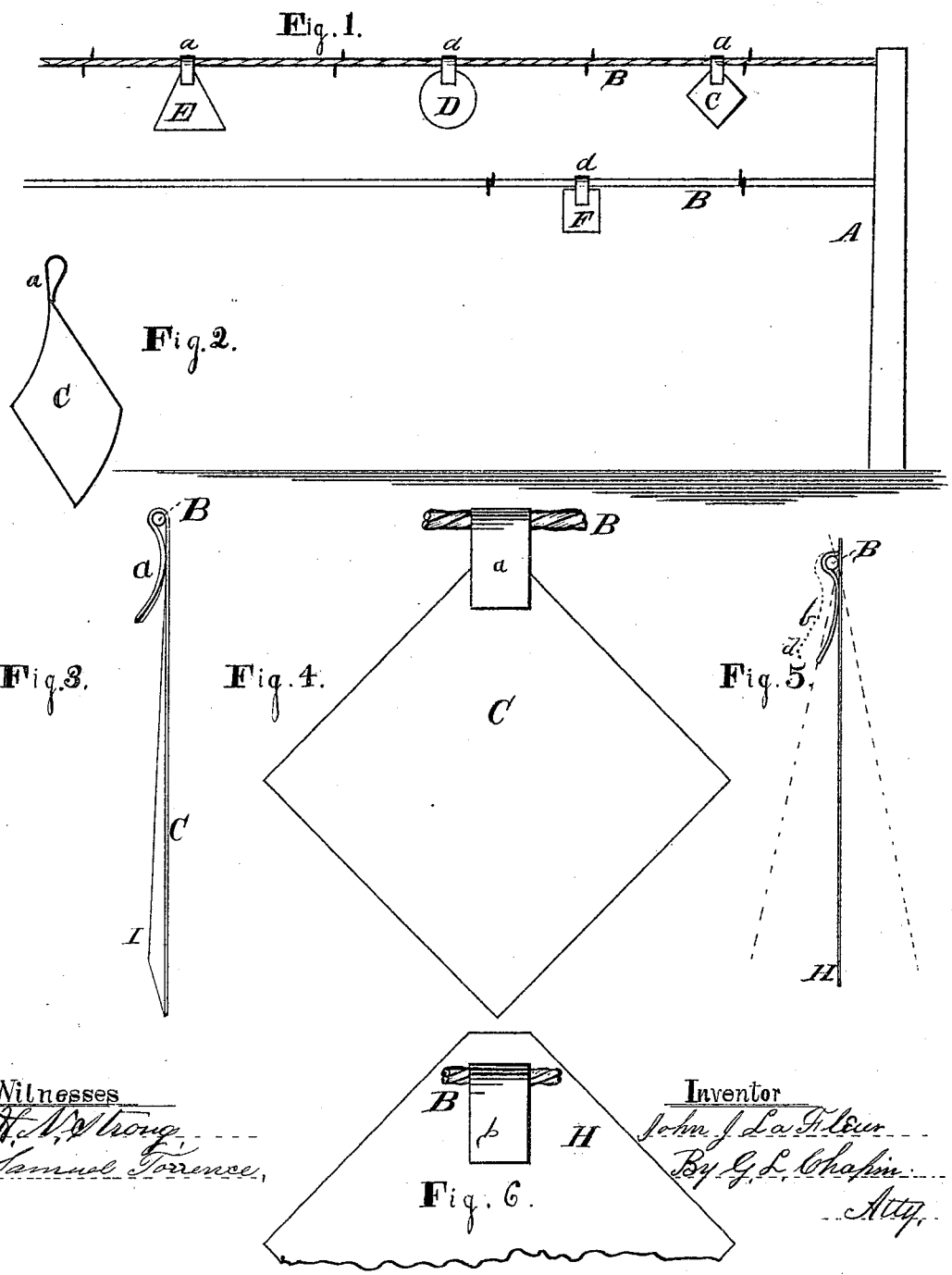

UNITED STATES PATENT OFFICE.

JOHN J. LA FLEUR, OF HYDE PARK, ILLINOIS, ASSIGNOR TO HIMSELF AND JAMES LANGILLE, OF SAME PLACE.

TAG FOR BARBED-WIRE FENCES.

SPECIFICATION forming part of Letters Patent No. 249,777, dated November 22, 1881.

Application filed July 5, 1881. (No model.)

*To all whom it may concern:*

Be it known that I, JOHN J. LA FLEUR, of Hyde Park, Cook county, State of Illinois, have invented a new and useful Improvement in Tags for Barbed-Wire Fences; and I do declare that the following is a full, clear, and exact description thereof, reference being had to the accompanying drawings, illustrating the improvement, in which—

Figure 1 is an elevation of a portion of barbed-wire fence to which my improvement is attached; Fig. 2, an edge view of a twisted tag detached from the wire; Fig. 3, an edge view of a tag somewhat twisted at the shank of the spring-hook; Fig. 4, an elevation of a tag as attached to a wire; Fig. 5, an edge view of a tag whose spring-catch is cut in the form of a tongue from the body of the tag; Fig. 6, a broken elevation of the tag shown at Fig. 5 and hung to the fence-wire.

The object of the present invention is to provide simple, cheap, and convenient means for making barbed-wire fences conspicuous; and the invention consists in suitable-sized strips or plates of tin or like metal, which are provided with spring-catches, by which the tags are suspended from the wires, so as to swing by the action of the wind, the tags being twisted so as to present suitable surfaces to the wind in any direction it blows, as the whole is hereinafter fully described and shown.

A represents a post, and B B two of the barbed wires attached thereto.

E D C H F represent five forms of tags, one of which may be, for the purpose designed, the equivalent of any of the others. Each of these tags, except H, is formed with a projection, *a*, which is bent over onto the tag proper to form a spring-hook, as more clearly shown at Fig. 3, to support the tag so as to swing or oscillate by the action of the wind.

The tag shown at Figs. 5 and 6 has a spring-hook formed by a tongue, *b*, cut from the body of the tag, and then bent so as to form a spring-hook to swing on the wire.

The form of the tag is immaterial, except the spring-hook, only so there be conspicuous surfaces exposed to attract the attention of stock and indicate where the fence is. If the tags were stationary or rigidly affixed to the wires of a fence, the wind against them, when blowing a gale, would cause too much strain and would not attract attention of stock, as when they oscillate.

In practice I prefer to make the tags about three inches square and hang them to the top wire of the fence between every second or third barb, as barbs are now placed, which would bring the tags about eighteen to twenty-seven inches apart; but I do not confine myself to this construction, as the tags may be smaller and placed farther apart and answer a good purpose. By hanging the tags in this manner they can move longitudinally on the wires from barb to barb by the action of the wind, but have no further movements in that direction. Such longitudinal movement is not necessary to the usefulness of the device, but adds to make the position of the fence more conspicuous. Neither do I confine myself to the hanging of the tags to the upper wire, but they may be hung to any or all the wires of the fence; but for cattle and horses the hanging to the top wire is the more desirable.

For cheapness, the tags may be cut by dies from scrap-tin, and shipped directly to the fence, and placed on the wires by the cheapest farm-labor. I twist the tags, as shown at Figs. 2 and 3, so that the wind blowing in any direction will oscillate them.

The necessity for providing means for indicating to stock where the wire fence is better than the wires will show is presumed too great to further require setting forth.

I claim and desire to secure by Letters Patent—

The twisted tags herein described, combined with the fence-wires between the barbs by means of spring-catches, as and for the purpose specified.

JOHN J. LA FLEUR.

Witnesses:
G. L. CHAPIN,
W. M. BOOTH.